Oct. 9, 1951 F. H. HARRIS, JR 2,570,233
AUTOMATIC GAIN CONTROL FOR PULSE AMPLIFIERS
Filed Dec. 13, 1945
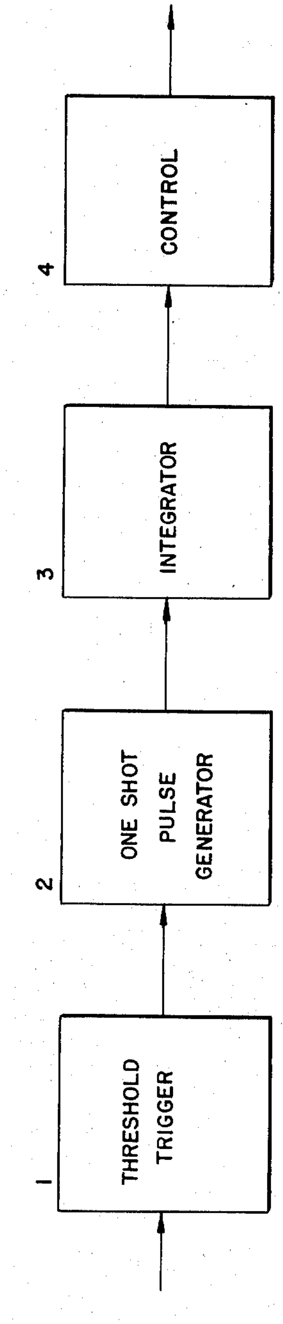
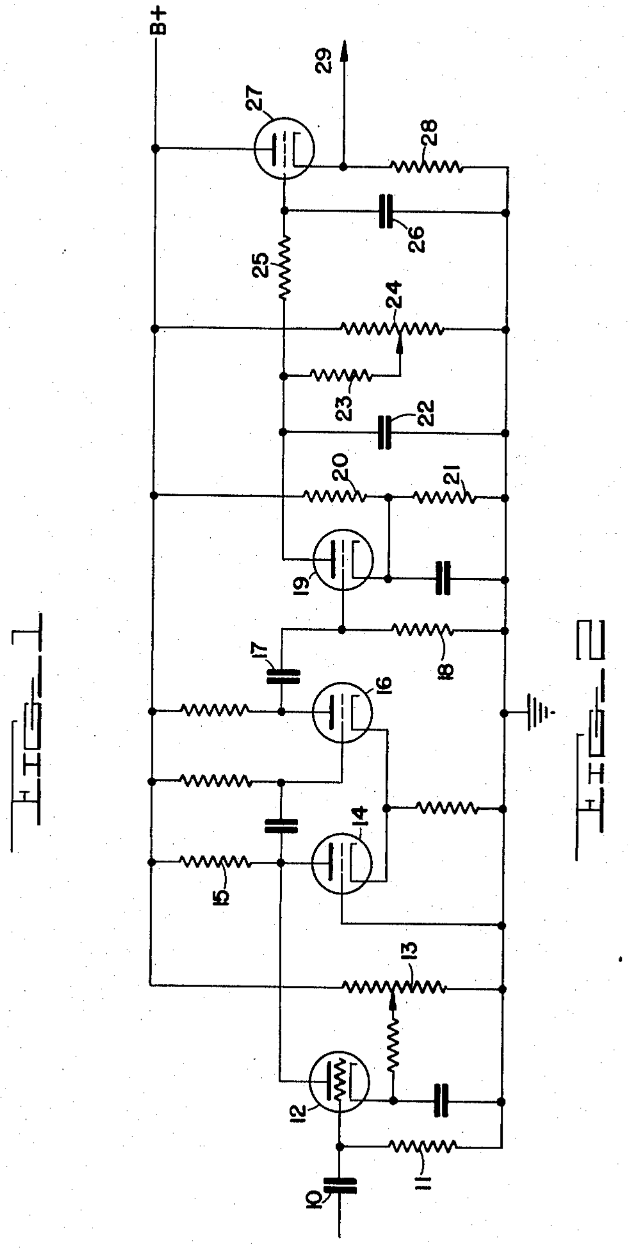
Inventor
FRANKLIN H. HARRIS, JR.
By M. C. Hayes
Attorney Patented Oct. 9, 1951 2,570,233

UNITED STATES PATENT OFFICE 2,570,233

AUTOMATIC GAIN CONTROL FOR PULSE AMPLIFIERS

Franklin H. Harris, Jr., United States Navy

Application December 13, 1945, Serial No. 634,878

5 Claims. (Cl. 179—171)

(Granted under the act of March 3, 1883, as amended April 30, 1928; 370 O. G. 757)

This invention relates to automatic gain control circuits for pulse reception.

In circuits amplifying electrical signals for application to actuate other circuits or for ultimate visual or audible presentation, it is frequently desirable that the gain in the amplifier circuits be controlled so that the output has some form of constant magnitude. For example, in broadcast receivers, automatic gain control circuits known to the art are employed to compensate for variations in reception occasioned by atmospheric conditions and other causes.

For pulsed signals, that aspect of the signal which it usually will be desired to hold substantially constant is the amplitude of the individual pulses rather than either the overall energy level of the signals or the peak amplitude of portions of the signals.

It is found that transmitted pulses are characterized by a slight random variation in amplitude from one pulse to the next, even if effort is made to hold them constant at the generating source. If radio transmission is involved, this primary random variation is greatly augmented before the pulsed signals reach a receiver. This random variation is utilized in the present invention to hold the average amplitude of the amplified pulses substantially constant.

An object of this invention is to provide means for controlling the gain of a pulsed signal amplifier so that the average amplitude of the output pulses remains substantially constant regardless of large changes in the average amplitude of the input pulses.

Another object of this invention is to provide means for controlling the gain of a pulsed signal amplifier so that the average amplitude of the output pulses remains substantially constant regardless of changes in the pulse repetition rate.

Other objects and features of this invention will become apparent from the following description and the accompanying drawings, in which:

Fig. 1 is a block diagram showing the interrelation of the components of the invention.

Fig. 2 is a schematic diagram of one particular embodiment of the invention.

In accordance with Fig. 1, the pulse output of the system to be controlled is applied to the threshold trigger 1. The threshold trigger is a circuit responsive to pulses which equal or exceed a selected critical amplitude. The invention operates, in the manner hereinafter described, to control the average amplitude of the output pulses so that this selected value lies within the range of random variation between individual pulses.

The threshold trigger actuates a one shot pulse generator 2 each time a pulse is received which exceeds the threshold. Accordingly, the average frequency of the output of the pulse generator depends upon both the pulse repetition rate of the received pulses and the average amplitude of these pulses as they are applied to the threshold trigger 1. When the average amplitude is sufficiently high, the pulse generator 2 is actuated by each received pulse; and the frequency of its output is the same as the repetition rate of the received pulses. When the average amplitude of the received pulses is reduced so that some of the pulses are below the threshold, the average frequency of the output of the pulse generator is less than the repetition rate of the received pulses. When the average amplitude of the received pulses is further reduced so that no pulses exceed the threshold, the pulse generator is inoperative.

The output of the pulse generator 2 is applied to integrator circuit 3. The integrator functions so that during the pulses a capacitor is charged (or discharged) according to one time constant and between pulses the capacitor discharges (or charges) according to another somewhat longer time constant. Consequently, the average voltage across the capacitor will be a function of the average pulse frequency. The voltage across this capacitor is applied to the control circuits 4.

In the control circuits 4 the input signal is filtered and amplified to control the gain of the pulse amplifier according to the particular means of gain control employed in the system with which this invention is used.

It is noted that the controlling voltage put out by the control circuits 4 can vary from a first limiting value when all of the received pulses are actuating the pulse generator to a second limiting value when none of the received pulses are actuating the pulse generator. This range in controlling voltage corresponds with the range in pulse amplitudes occasioned by the random variations between individual pulses. It is apparent that if the range in gain covered by this range in controlling voltage is sufficient to bring an increased received pulse amplitude below the threshold and to bring a decreased received pulse amplitude above the threshold, the output pulses from the controlling amplifier will have an average amplitude such that some but not all of them will trigger the pulse generator 2. The latter condition limits the variation in output amplitude to the range of random variations in received pulses. This range is usually sufficiently small so that the pulse amplitude appears to remain constant even when the pulse repetition rate changes.

In the specific embodiment of the invention shown in Fig. 2 the output from the amplifier being controlled (or the demodulated output from the amplifier being controlled when gain control is effected in radio frequency stages) is applied to trigger tube 12 through the coupling network comprising capacitor 10 and resistor 11. The cathode of trigger tube 12 is maintained at a selected positive potential determined by the position of the movable tap on potentiometer 13; consequently, tube 12 is rendered conducting only by positive pulses exceeding a critical amplitude.

Trigger tube 12 and tube 14 have the same plate load resistor 15. Tube 14 is the normally non-conducting tube of a cathode coupled one shot multivibrator comprising tubes 14 and 16 and their associated circuits. Accordingly, when tube 12 is momentarily rendered conducting, this multivibrator is actuated, and a positive pulse is applied through the coupling network comprising capacitor 17 and resistor 18 to an over biased amplifier tube 19.

The over biased amplifier tube is held normally cut off by the voltage applied to its cathode from the voltage divider comprising resistors 20 and 21. The plate of tube 19 is connected to the center tap of potentiometer 24 through a large resistor 23. Capacitor 22 is connected between the plate of tube 19 and ground. Consequently, when tube 19 is rendered conducting during the pulses applied from the one shot multivibrator, capacitor 22 discharges through the tube. Immediately after the termination of each pulse, the capacitor tends to recharge through resistor 23. The charging time constant is substantially longer than the discharging time constant.

The voltage across capacitor 22 is filtered in the network comprising resistor 25 and capacitor 26 and applied to the control grid of a high conductance tube 27. Accordingly, the signal applied to the grid of tube 27 is a substantially direct current voltage which can vary between the potential at the tap of potentiometer 24 when no pulses are triggering tube 12 and a potential slightly higher than that of the cathode of tube 19 when frequent pulses are triggering tube 12.

Tube 27 is connected as a cathode follower with plate load resistor 28. The output 29 is applied as the plate and screen voltage of the amplifier stages being controlled. It is apparent that when the average amplitude of the pulses received by the controlled amplifier increases, the average amplitude of the output pulses from this controlled amplifier momentarily increases, increasing the frequency with which the multivibrator is triggered. When the average frequency of the multivibrator output increases, the average voltage across capacitor 22 decreases and correspondingly the voltage applied to the plates and screens of the controlled amplifier stages decreases. Consequently, the average amplitude of the output pulses from this amplifier is reduced toward its original value.

Similarly, a decrease in the strength of the received signals results in a suitable increase in amplifier gain.

Potentiometer 13 determines the average amplitude of the output pulses from the amplifier being controlled. Potentiometer 24 determines the gain of the amplifier in the quiescent condition.

The invention described herein may be manufactured and used by or for the Government of the United States of America for governmental purposes without the payment of any royalties thereon or therefor.

What is claimed is:

1. A means for controlling the gain of a pulsed signal amplifier which comprises, a pulse amplitude discriminator coupled to the output of said pulsed amplifier operative to reject pulses below a predetermined level, a pulse generator for generating a pulse in response to a pulse from said discriminator, and means integrating the output from said pulse generating means to form a control potential.

2. A means for controlling the gain of a pulsed signal amplifier which comprises, a pulse amplitude discriminator coupled to the output of said pulsed amplifier operative to reject pulses below a predetermined level, a pulse generator for generating a pulse in response to a pulse from said discriminator; integrating circuit means connected to said pulse generator for developing an average voltage proportional to the pulse repetition rate of the pulses generated by said generating means and means for converting the output of said integrating circuit means into a control voltage.

3. A means for controlling the gain of a pulsed signal amplifier which comprises, a pulse amplitude discriminator coupled to the output of said pulsed amplifier operative to reject pulses below a predetermined level, a pulse generator for generating a pulse in response to a pulse from said discriminator; integrating circuit means connected to said pulse generator for developing an average voltage proportional to the pulse repetition rate of the pulses generated by said generating means; filter means for converting the output of said integrating circuit means into a control voltage; and amplifier means amplifying the output of said filter means.

4. A means for controlling the gain of a pulsed signal amplifier which comprises; a vacuum tube which is rendered conducting only by signals exceeding a selected amplitude, said vacuum tube receiving the output from said amplifier; pulse generating means coupled to said vacuum tube and actuated for one pulse whenever said vacuum tube is rendered conducting; circuit means including a capacitor connected to said pulse generating means responsive to successively derived pulses therefrom so that the average charge on said capacitor is determined by the average frequency of the pulses in the output of said pulse generating means; and filter means converting the voltage across said capacitor into a substantially direct current control voltage.

5. A means for controlling the gain of a pulsed signal amplifier which comprises; a vacuum tube which is rendered conducting only by signals exceeding a selected amplitude, said vacuum tube receiving the output from said amplifier; pulse generating means responsive to said vacuum tube and actuated for one pulse whenever said vacuum tube is rendered conducting; means connected to said pulse generating means for deriving a pulse therefrom upon each actuation; a capacitor connected to said means so as to have its charge modified during said received pulses, said charge tending to return to its original value between said pulses; filter means converting the voltage across said capacitor to a substantially direct current voltage, and means amplifying said direct current voltage for control of said pulsed signal amplifier.

FRANKLIN H. HARRIS, Jr.

REFERENCES CITED

The following references are of record in the file of this patent:

UNITED STATES PATENTS

| Number | Name | Date |
|---|---|---|
| 2,060,969 | Beer | Nov. 17, 1936 |
| 2,240,600 | Applegarth, Jr. | May 6, 1941 |
| 2,259,538 | Wheeler | Oct. 21, 1941 |
| 2,260,933 | Cooper | Oct. 28, 1941 |